(12) United States Patent
Hackney

(10) Patent No.: US 9,908,040 B2
(45) Date of Patent: *Mar. 6, 2018

(54) GAME CONTROLLER

(71) Applicant: CINCH GAMING EQUIPMENT LLC, Ypsilanti, MI (US)

(72) Inventor: James Hackney, Ypsilanti, MI (US)

(73) Assignee: CINCH GAMING EQUIPMENT LLC, Ypsilanti, MI (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/553,249

(22) Filed: Nov. 25, 2014

(65) Prior Publication Data

US 2016/0144275 A1    May 26, 2016

(51) Int. Cl.
  *A63F 9/24*      (2006.01)
  *A63F 13/24*     (2014.01)
  *A63F 13/218*    (2014.01)
  *A63F 13/22*     (2014.01)

(52) U.S. Cl.
  CPC ............ *A63F 13/24* (2014.09); *A63F 13/218* (2014.09); *A63F 13/22* (2014.09)

(58) Field of Classification Search
  CPC ......... A63F 13/22; A63F 13/24; A63F 13/218
  See application file for complete search history.

(56) References Cited

U.S. PATENT DOCUMENTS

| | | | | |
|---|---|---|---|---|
| 8,777,620 | B1* | 7/2014 | Baxter | F41A 33/00 235/404 |
| 9,504,911 | B2* | 11/2016 | Hackney | A63F 13/24 |
| 2010/0069154 | A1* | 3/2010 | Claussen | A63F 13/02 463/37 |
| 2010/0298053 | A1 | 11/2010 | Kotkin | |
| 2012/0244944 | A1 | 9/2012 | Kotkin | |
| 2012/0322555 | A1 | 12/2012 | Burgess et al. | |
| 2014/0018173 | A1* | 1/2014 | Urhman | A63F 13/24 463/37 |
| 2016/0144275 | A1* | 5/2016 | Hackney | A63F 13/24 463/37 |

OTHER PUBLICATIONS

European Patent Office, Partial European Search Report for European Patent Application 15 196 100.0-1906 dated Aug. 25, 2016.

* cited by examiner

*Primary Examiner* — Raleigh W Chiu
(74) *Attorney, Agent, or Firm* — Lorenz & Kopf, LLP

(57) ABSTRACT

A game controller is provided. In one embodiment, the game controller includes a main body, a trigger device, and a first adjustment mechanism. The trigger device has a trigger body coupled to the main body and that pivots along a pivotal axis relative to the main body. The first adjustment device has a first surface that contacts a second surface of the main body at a first point of contact when the trigger body is moved. The first adjustment device is movable along a first axis such that the first point of contact is adjusted along the first axis.

20 Claims, 2 Drawing Sheets

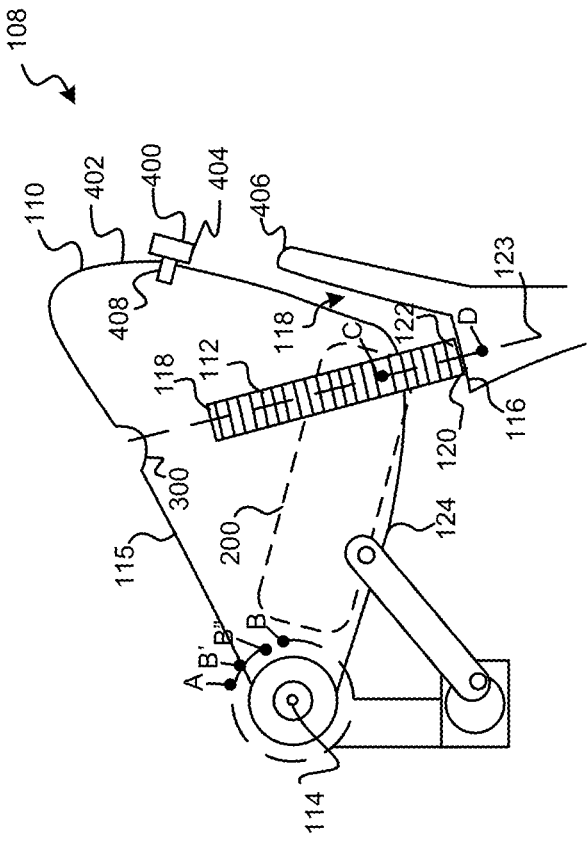
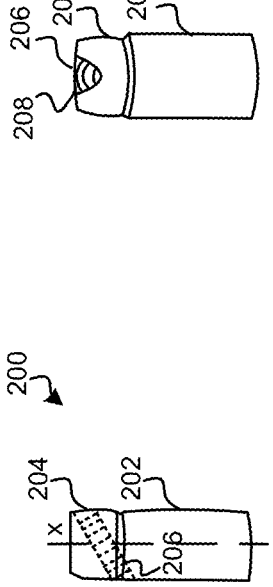
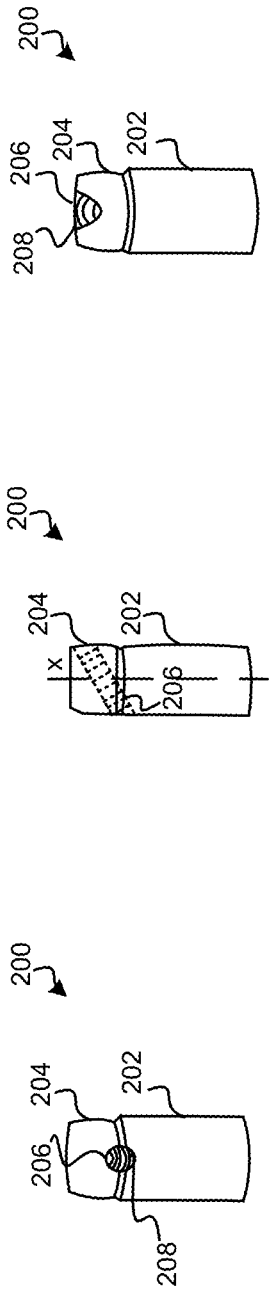

GAME CONTROLLER

TECHNICAL FIELD

The present disclosure generally relates to controllers for controlling the play of computerized games, and more particularly to a trigger mechanism of a game controller.

BACKGROUND

Game controllers include one or more actuator devices that are depressible by an index finger or other finger of a user. Some actuator devices may be trigger actuators, that, when depressed, generate signals indicating an amount or degree of depression. The trigger signals are sent to a game console and used to control a feature of the game.

During game play, in some instances, it is desirable to depress the trigger actuator only a certain amount. For example, when controlling the trigger mechanism of a simulated weapon such as a machine gun, it is desirable to depress the trigger to a certain position such that firing the weapon has been achieved. Once firing the weapon has been achieved, it is not desirable in some situations to depress the trigger any further even though the user may do so. In many cases depressing the trigger further does not change any in-game features and therefore only increases the time in which successive trigger pulls can be made. As can be appreciated, not all features in game play have the same desired position, and it may be difficult for a user to intentionally depress the trigger to a particular position.

Accordingly, it is desirable to provide methods and systems for adjusting the trigger mechanism such that a set stop position may be achieved during game play. Furthermore, other desirable features and characteristics of the present invention will become apparent from the subsequent detailed description of the invention and the appended claims, taken in conjunction with the accompanying drawings and this background of the invention.

SUMMARY

A game controller is provided. In one embodiment, the game controller includes a main body, a trigger device, and a first adjustment mechanism. The trigger device has a trigger body coupled to the main body and that pivots along a pivotal axis relative to the main body. The first adjustment device has a first surface that contacts a second surface of the main body at a first point of contact when the trigger body is moved. The first adjustment device is movable along a first axis such that the first point of contact is adjusted along the first axis.

DESCRIPTION OF THE DRAWINGS

The present disclosure will hereinafter be described in conjunction with the following drawing figures, wherein like numerals denote like elements, and:

FIG. 3 is a cross-sectional view of a portion of a side of the game controller of FIGS. 1 and 2 in accordance with various embodiments;

FIG. 4 is a back view of a receiver that can be housed within a trigger body of the game controller of FIGS. 1 and 2 in accordance with various embodiments;

FIG. 5 is a side view of the receptor of FIG. 4 in accordance with various embodiments; and FIG. 6 is a front view of the receptor of FIG. 4 in accordance with various embodiments.

DETAILED DESCRIPTION

Figures 1, 2:
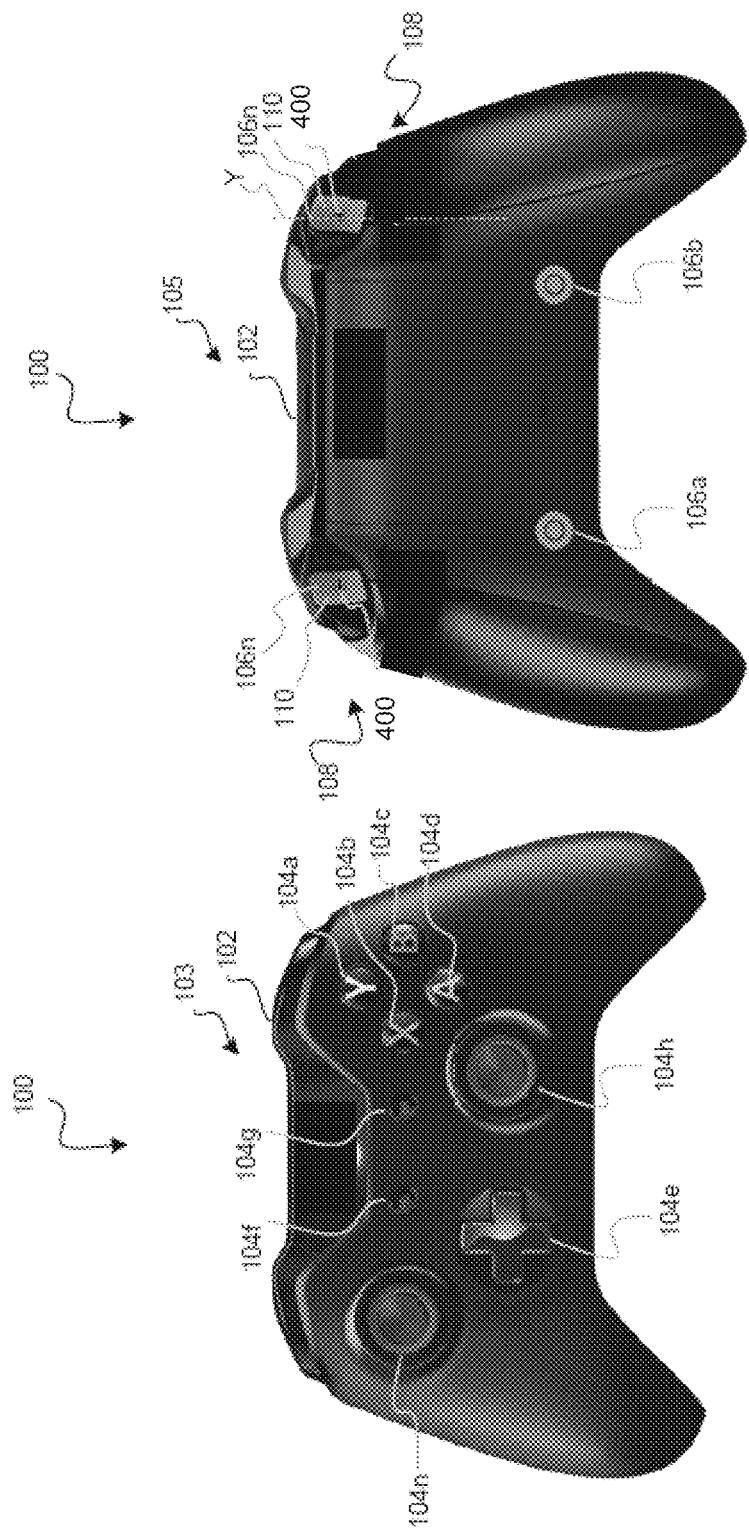
FIG. 1 is a perspective view of a front of an exemplary game controller in accordance with various embodiments.
FIG. 2 is a perspective view of a back of the game controller of FIG. 1 in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

With reference to FIGS. 1-2, a game controller 100 is shown that includes one or more trigger adjustment mechanisms in accordance with various embodiments. Although the figures shown herein depict an example with certain arrangements of elements, additional intervening elements, devices, features, or components may be present in an actual embodiments. It should also be understood FIGS. 1-2 are merely illustrative and may not be drawn to scale.

As depicted in FIGS. 1-2, the game controller 100 generally includes a housing or a main body 102 and one or more actuator devices 104a-104n coupled thereto. The main body 102 may be configured of one or more pieces that are cooperatively configured to be held by a player or user of a game. The actuator devices 104a-104n generate signals that are transmitted (e.g., wired or wirelessly) to a game console (not shown) and/or processed within the game controller 100 for game play.

In various embodiments, a front side 103 of the game controller 100 (shown in FIG. 1) includes actuator devices 104a-104n that, when depressed or manipulated by a finger or thumb of the user, generate signals that indicate the depression of the button or a direction or degree in which the button was manipulated. For example, one or more of the actuator devices 104a-104g may be digital devices (e.g., selection buttons, direction pads, etc.) that generate digital signals based on the depression of the respective actuator device 104a-104g. In another example, one or more of the actuator devices 104h-104n may be analog devices (e.g., joysticks, etc.) that generate analog signals based on manipulation of the respective actuator device 104h-104n.

A back side 105 of the game controller 100 (shown in FIG. 2) similarly includes actuator devices such as actuator devices 106a-106n that, when depressed or manipulated by a finger or thumb of the user, generate signals that indicate the depression of the respective actuator devices 106a-106n or a direction or degree in which the respective actuator devices 106a-106n was manipulated. For example, one or more of the actuator devices 106a-106b may be digital devices (e.g., selection buttons, or other buttons) that generate digital signals based on the depression of the actuator device 106a-106b.

In various embodiments, at least one of the actuator devices 106a-106n on the back side 105 of the game controller 100 is a trigger device 108. The trigger device 108 includes a trigger body 110 that is depressible. The trigger device 108 may be an analog device that, when depressed generates an analog signal based on an amount or degree of the depression.

In various embodiments, the trigger device 108 includes an adjustable adjustment device that is internal to the main body 102 in accordance with various embodiments. In one example, the internal adjustable adjustment device adjusts a stop position of the trigger device 108. For example, the adjustable adjustment device includes a surface area that contacts a surface area of the main body 102 when the trigger body 110 is moved or depressed a certain amount. The contact between the two surface areas stops the trigger body 110 from further movement.

As shown in more detail in the cross sectional side view of FIG. 3 (from the section plane Y of FIG. 2), the trigger body 110 pivots along a pivot axis 114 which may be substantially perpendicular to one of the surfaces of the main body 102 (FIGS. 1 and 2). In one example, a first or top side 115 of the trigger body 110 moves or pivots between point A (a start point) and point B (a stop point). The adjustable adjustment device 112 is used to adjust the point B (the stop point) to B' (an adjusted stop point).

For example, at least a portion of the adjustable adjustment device 112 extends from the trigger body 110. When the trigger body 110 is depressed enough (as shown in FIG. 3), a surface area 116 of an inner side 118 of the main body 102 contacts a surface area 120 at a first end 122 of the adjustable adjustment mechanism 112 to stop the trigger body 110 from further depression.

Given the length of the adjustable adjustment device 112 shown, the surface area 120 of the adjustable adjustment device 112 (and thus, the contact position between the surface area 116 and the surface area 120) may be adjusted to any number of positions between point C and point D along an axis 123. Adjusting the position of the adjustable adjustment device 112 relative to the main body 102 causes the point B on the pivot axis 114 to be adjusted to point B' as shown or any other position therebetween. It should be noted that although the surface area 120 and surface area 116 are described and illustrated herein, the contact between the adjustable adjustment mechanism 112 and the main body 102 is not limited to surface contact. Rather, the adjustable adjustment mechanism 112 may contact the main body 102 through point to point contact, or point to surface contact. Thus, the embodiments herein are merely exemplary. In various embodiments, when the adjustable adjustment device 112 is adjusted to point C or slightly above, the surface area 120 may not contact any surface area of the main body 102, rather the trigger body 110 may pivot as if the adjustable adjustment device 112 were completely removed.

For exemplary purposes, the embodiments described and shown include a screw as the adjustable adjustment device 112. As can be appreciated, in various other embodiments, the adjustable adjustment device 112 may be implemented as a plunger device, a screw or rod with a lever or arm attached, a screw or rod with any number of modifications or attachments, a rack and pinion, or any other element that is adjustable relative to the trigger body 110 to adjust the movement of the trigger device 108.

In various embodiments, the adjustable adjustment device 112 extends from a receiver 200 that is housed within the trigger body 110. The receiver 200 may be any suitable material or device capable of accommodating the adjustable adjustment device 112 in the requisite position. As shown in FIGS. 4-6 and with continued reference to FIG. 3, an exemplary receiver 200 is a preformed part of plastic or other material that is inserted into the trigger body 110. For example, the receiver 200 is sized such that it is insertable into a bore defined at a bottom 124 of the trigger body 110 (FIG. 3). In various embodiments, with reference to FIG. 4, the receiver 200 is substantially rectangular and includes a first or base portion 202 and a second or top portion 204. The base portion 202 is substantially rectangular in shape with substantially flat sides and one or more rounded edges. The top portion 204 is substantially square-like in shape with at least one substantially flat side and somewhat rounded other sides. It should be noted that the size and shape of the receiver 200 described and illustrated herein is merely exemplary, as the receiver 200 can have any desired shape and size for receipt of the adjustable adjustment device 112 within the trigger body 110.

The receiver 200 includes a throughbore 206 for receiving the adjustable adjustment device 112. As shown in the back view of the receiver 200 in FIG. 4, the throughbore 206 begins at a first position in the base portion 202. As shown in the side view of the receiver 200 in FIG. 5, the throughbore 206 extends through the receiver 200 at an angle that is offset X degrees from the horizontal or vertical axis. As shown in the front view of the receiver in FIG. 6, the opening 206 ends at a second position in the top portion 204. Stated another way, the throughbore 206 is defined through the receiver 200 along an axis that is transverse to a longitudinal axis of the receiver 200, and further, the throughbore 206 is defined through the receiver 200 so as to extend from a portion of the base portion 202 to the top portion 204.

When the adjustable adjustment device 112 is implemented as a screw, the throughbore 206 of the receiver 200 includes one or more screw threads 208 that cooperate to matingly engage one or more screw threads associated with the screw. The screw threads 208 may be cut into the adjustment mechanism receptor 200 or may be part of a thread insert (not shown) that is inserted into the throughbore 206 in the receiver 200.

With reference back to FIG. 3, the trigger body 110 optionally includes an opening 300 for accessing the adjustable adjustment device 112. An adjustment tool (not shown) may be inserted into the opening 300 to access and move or adjust the adjustable adjustment device 112 from a second end 126 of the adjustable adjustment device 112. Alternatively, the adjustable adjustment device 112 may be moved or adjusted from the first end 122 when, for example a portion of the main body 102 is removed.

With reference back to FIG. 2, in addition to the adjustable adjustment device 112, in various embodiments, the trigger device 108 may further include a non-adjustable adjustment mechanism 400. The non-adjustable adjustment mechanism 400 extends through a side 402 (FIG. 3) of the trigger body 110 to provide a non-adjustable stop position for the trigger device 108. For example, with reference to FIGS. 2 and 3, the non-adjustable adjustment mechanism 400 includes a surface area 404 that contacts a surface area 406 of the main body 102 when the trigger body 110 is depressed a certain amount. The contact of the two surface areas 404, 406 stops the trigger body 110 from further movement.

As shown in more detail in the cross sectional view of FIG. 3, in various embodiments, when the trigger body 110 is depressed enough, the surface area 404 of the non-adjustable adjustment mechanism 400 that protrudes out from the trigger body 110 contacts the surface area 406 of the main body 102 to stop the trigger body 110 from further movement or depression. When the non-adjustable adjustment mechanism 400 is in place, the stop position of the top side 115 of the trigger body 110 is point B". When the non-adjustable adjustment mechanism 400 is removed, the stop position of the top side 115 of the trigger body 110 is between point A and point B depending on whether the adjustable adjustment device 112 is in place.

For exemplary purposes, the embodiments described and shown implement the non-adjustable adjustment mechanism 400 as a screw that extends through a side 402 of the trigger body 110. The screw is received in screw threads 408 defined in a portion of the trigger body 110. The screw threads 408 may be cut into the trigger body 110 or may be part of a thread insert (not shown) that is inserted into an opening in the trigger body 110. As can be appreciated, in various other embodiments, the non-adjustable adjustment mechanism 400 may be implemented at various locations of the trigger body 110. For example, the non-adjustable adjustment mechanism 400 may extend through a side or sides of the trigger body 110, so long as when moved or depressed, the non-adjustable adjustment mechanism 400 contacts a surface area of the main body 102 to limit movement of the trigger body 110 about the pivot axis. As can further be appreciated, in various embodiments, the non-adjustable adjustment mechanism 400 may be implemented as a rod inserted into holes, a screw screwed into threads, a protrusion, or any other mechanism for creating a contact surface that stops the movement of the trigger body 110 relative to the main body 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A game controller, comprising:
   a main body;
   a trigger device having a trigger body coupled to the main body and that pivots along a pivotal axis relative to the main body; and
   a first adjustment device having a first surface that contacts a second surface of the main body at a first point of contact when the trigger body is moved, wherein the first adjustment device is movable along a first axis such that the first point of contact is adjusted along the first axis.

2. The game controller of claim 1, wherein the contact stops the trigger body from further movement.

3. The game controller of claim 1, wherein the first adjustment device is coupled to the trigger body.

4. The game controller of claim 3, wherein the first adjustment device comprises a screw.

5. The game controller of claim 4, wherein the trigger body includes a receiver that receives at least a portion of the adjustment device.

6. The game controller of claim 5, wherein the receiver includes a throughbore defining one or more threads for receiving the screw.

7. The game controller of claim 5, wherein the receiver includes a thread insert disposed within a throughbore for receiving the screw.

8. The game controller of claim 5, wherein the receiver includes a throughbore that extends along an axis that is transverse to a longitudinal axis of the receiver.

9. The game controller of claim 8, wherein the receiver includes a first portion and a second portion, and a throughbore that begins at the first portion and extends through the second portion.

10. The game controller of claim 1, further comprising a second adjustment device having a third surface that contacts a fourth surface of the main body at a second point of contact when the trigger body is moved.

11. The game controller of claim 10, wherein the contact stops the trigger body from further movement.

12. The game controller of claim 10, wherein the second adjustment device is coupled to the trigger body.

13. The game controller of claim 10, wherein the second adjustment device comprises a screw.

14. A game controller, comprising:
    a main body;
    a trigger device having a trigger body is coupled to the main body and the trigger device moves along an axis; and
    a first adjustment device that is adjustable between a range of positions and that contacts the main body to limit the movement of the trigger body relative to the main body.

15. The game controller of claim 14, wherein the first adjustment device is coupled to the trigger body, and a portion of the trigger body is received within the main body.

16. The game controller of claim 14, wherein the first adjustment device comprises a screw, the trigger body comprises a receiver for receiving the screw.

17. The game controller of claim 16, wherein the receiver defines a throughbore that includes a thread insert or threads cut into the throughbore for receiving the screw.

18. The game controller of claim 14, further comprising:
    a second adjustment device that is fixed relative to the trigger body and that contacts the main body to limit the movement of the trigger body when the trigger body is moved a second amount.

19. The game controller of claim 18, wherein the second adjustment device is at least partially received in an opening defined in the trigger body.

20. The game controller of claim 19, wherein the second adjustment device comprises a screw.

* * * * *